US00RE40181E

(19) United States
(12) Reissued Patent
Scherzer et al.

(10) Patent Number: US RE40,181 E
(45) Date of Reissued Patent: Mar. 25, 2008

(54) INFRARED RADIATOR WITH CARBON FIBER HEATING ELEMENT CENTERED BY SPACERS

(75) Inventors: Joachim Scherzer, Bruchkobel (DE); Siegfried Grob, Maintal (DE)

(73) Assignee: Heraeus Noblelight GmbH, Hanau (DE)

(21) Appl. No.: 10/838,182

(22) Filed: Aug. 31, 2004

Related U.S. Patent Documents

Reissue of:
(64) Patent No.: 6,591,062
Issued: Jul. 8, 2003
Appl. No.: 09/881,176
Filed: Jun. 14, 2001

(30) Foreign Application Priority Data

Jun. 21, 2000 (DE) ..... 100 29 437

(51) Int. Cl.
*H01K 1/18* (2006.01)

(52) U.S. Cl. ..... 392/407; 219/553; 219/548; 313/110

(58) Field of Classification Search ..... 392/407, 392/411; 219/548, 551, 553, 541; 313/110–111; 250/495.1, 504 R; 362/231, 234; 34/266
See application file for complete search history.

(56) References Cited

U.S. PATENT DOCUMENTS

| | | | | | |
|---|---|---|---|---|---|
| 2,705,310 | A | * | 3/1955 | Hodge | 439/612 |
| 2,910,605 | A | * | 10/1959 | Hodge | 313/113 |
| 2,980,820 | A | * | 4/1961 | Brundige et al. | 313/279 |
| 3,223,875 | A | * | 12/1965 | Eggers | 313/273 |
| 4,103,277 | A | * | 7/1978 | Griffin et al. | 338/237 |
| 5,157,758 | A | * | 10/1992 | Halberstadt et al. | 392/408 |
| 6,057,532 | A | * | 5/2000 | Dexter et al. | 219/553 |
| 6,122,438 | A | * | 9/2000 | Scherzer et al. | 392/411 |
| 2005/0047766 | A1 | * | 3/2005 | Linow et al. | 392/407 |
| 2006/0016803 | A1 | * | 1/2006 | Kim et al. | 219/553 |
| 2006/0032847 | A1 | * | 2/2006 | Kim et al. | 219/553 |

FOREIGN PATENT DOCUMENTS

| | | | | |
|---|---|---|---|---|
| DE | 1042785 | * | 11/1958 | 219/553 |
| DE | 1969200 | * | 9/1967 | |
| DE | 9115621 U1 | * | 4/1992 | |
| DE | 91 15 621.1 U1 | * | 4/1992 | |
| DE | 44 18 285 | * | 12/1995 | |
| DE | 4419285 | * | 12/1995 | |
| DE | 4438870 | * | 5/1996 | |
| DE | 195 45 296 A1 | | 6/1997 | |
| DE | 19839457 | * | 3/2000 | |
| DE | 198 39 457 | * | 3/2000 | |
| EP | 163348 | * | 12/1985 | |
| GB | 864318 | * | 4/1961 | 392/407 |
| GB | 1261748 | * | 1/1972 | |
| GB | 1449851 | | 9/1976 | |
| GB | 2233150 | * | 1/1991 | |
| GB | 2278722 A | | 12/1994 | |
| JP | 53-102976 | * | 9/1978 | |
| JP | 3-59981 | * | 3/1991 | |
| SU | 905918 | * | 2/1982 | |
| WO | 9016137 | * | 12/1990 | |

* cited by examiner

*Primary Examiner*—Tu Ba Hoang
*Assistant Examiner*—Stephen J. Ralis
(74) *Attorney, Agent, or Firm*—Fulbright & Jaworski L.L.P.

(57) ABSTRACT

The invention relates to an infrared radiator with a heating element containing carbon fibers disposed in a quartz glass tube, with its ends connected to contact elements running through the wall of the quartz glass tube. The known radiators are improved by the fact that the heating element is spaced away from the wall of the quartz glass tube and it is centered on the axis of the quartz glass tube by means of spacers. The invention furthermore relates to a method by which the infrared radiator is operated at heating element temperatures greater than 1000° C.

35 Claims, 6 Drawing Sheets

INFRARED RADIATOR WITH CARBON FIBER HEATING ELEMENT CENTERED BY SPACERS

Matter enclosed in heavy brackets [ ] appears in the original patent but forms no part of this reissue specification; matter printed in italics indicates the additions made by reissue.

BACKGROUND AND SUMMARY OF THE INVENTION

The invention relates to an infrared radiator having a heating element disposed in a quartz glass tube and a heating element containing carbon fibers, the ends of the heating element being connected to contact elements passing through the wall of the quartz glass tube. The invention furthermore relates to a method for the operation of such an infrared radiator.

Infrared radiators of the stated kind are disclosed, for example, in DE 198 39 457 A1. They have spiral-shaped heating elements of carbon fibers. Such carbon fibers have the advantage that they permit rapid temperature change, so they are characterized by great speed of reaction. Due to its spiral shape and the great surface area which it provides, the known carbon radiator has a relatively high radiation output and is suitable for operation at temperatures below 1000° C. In its practical form, heating element temperatures of maximum 950° C. are preferred. The achievable radiation power is limited by this top temperature limit.

Similar infrared radiators are described in DE 44 19 285 A1. Here a carbon ribbon is formed in a serpentine manner from a plurality of interconnected sections. GB 2,233,150 A likewise discloses infrared radiators in which the heating element is configured as a carbon ribbon. Infrared radiators with metallic heating elements are disclosed in DE-GM 1,969,200 and GB 1,261,748 and EP 163 348 A1. On account of a relatively small surface area, these also can achieve only limited radiation output. It is known especially from the last two disclosures named to configure the heating elements such that they are in contact with the surrounding quartz tube and are supported thereon.

It is a general problem with infrared radiators that quartz tubes easily recrystallize above about 1000° C., especially in case of contact, so that they become unusable.

The present invention is addressed to the problem of offering an improved infrared radiator, especially one with greater radiation output and long life, and to describe a method for its operation.

This problem is solved as to the infrared radiator in that the heating element is spaced away from the wall of the quartz glass tube and that the heating element is centered by spacers on the axis of the quartz glass tube, and nevertheless the spacers are heat bridges. Surprisingly it has been found that thus the temperature of the heating element can be increased substantially without recrystallizing the quartz glass tube, since the contact with the heating element (carbon fibers) causing the recrystallization is prevented. Especially it is advantageous for the achievement of a high radiation output if the heating element is in the form of a spiral or coiled ribbon.

It is appropriate that the inside diameter of the quartz glass tube be at least 1.5 times as great as the diameter of the spiral or coil of the heating element. At such a distance apart, preferably at such a diameter ratio, preferably at a ratio of about 1.7, the temperature of the heating element can be increased to definitely more than 1000° C. At a diameter ratio of about 2.5, the temperature of the heating element can be raised to temperatures above 1500° C., so that the radiation power, which is proportional to the fourth power of the absolute temperature, increases accordingly.

Advantageously, the spacers are made of molybdenum and/or tungsten and/or tantalum or of an alloy of at least two of these metals. It has been found that such spacers have on the one hand great thermal stability, but on the other hand the heating of the quartz glass tube to its recrystallization is prevented.

It is especially advantageous to a stable arrangement of the heating element that the spacers have at least at their side facing the heat elements, an expanse lengthwise of the heating element that is greater than the distances formed in this longitudinal direction between the coils of the heating element. Thus any slippage of the spacers into the gaps between the individual spirals is prevented even in the case of vibration.

It is appropriate to provide ceramic between the heating element and the spacers, especially aluminum oxide or zirconium dioxide, since this increases the life of the heating element and prevents premature burnout.

It is furthermore advantageous to make the contact elements of resilient material at their ends connected to the heating element, in order to assure reliable fixation of the contact elements before they are welded to additional contacts. Molybdenum can be used especially as resilient material.

The ends of the contact elements which are connected to the heating element can also be in the form of sleeves clutching these ends of the heating element; the sleeves can be made of molybdenum.

It has proven to be advantageous to provide graphite, especially graphite paper, between the ends of the heating element and the contact elements, in order to optimize the galvanic contact between the contact element and the carbon fibers of the heating element. The heating element appropriately consists substantially or exclusively of carbon fibers.

Between the graphite and the heating element, a noble metal paste and/or a metallic coating applied to the ends of the heating element can be provided. The metal coating can be formed of nickel or a noble metal and can preferably be applied galvanically.

Thus the contact is further improved. Welding of the contact-making parts can be done by resistance welding or laser welding.

The problem is solved for the method of operating an infrared radiator in that the heating element is heated to a temperature greater than 1000° C., preferably greater than 1500° C.

An embodiment of the invention will be explained with the aid of drawings.

DETAILED DESCRIPTION

Figure 1:
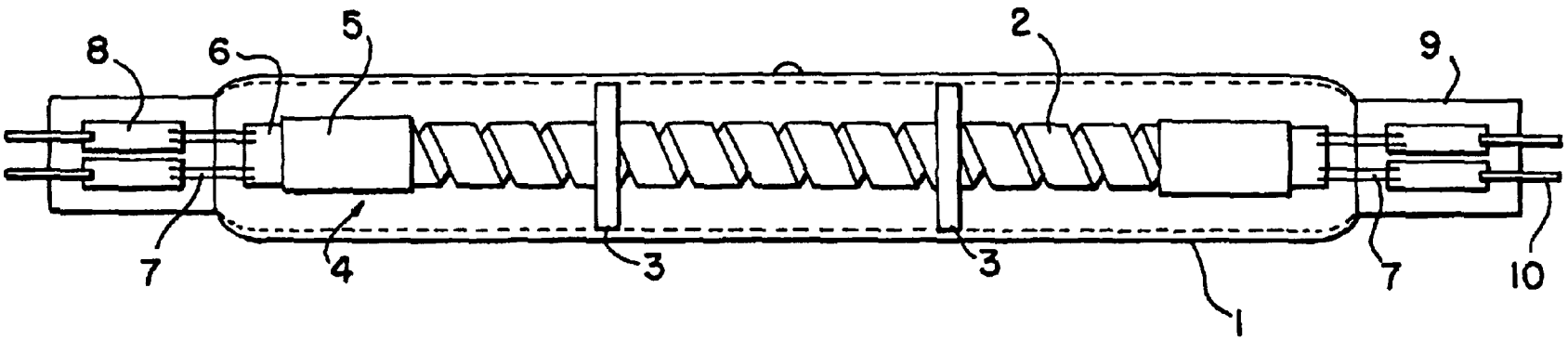
FIG. 1 shows a spiral carbon radiator pursuant to the invention.

In FIG. 1 there is represented an infrared radiator in accordance with the invention. In a glass tube 1 a spirally wound carbon ribbon is disposed as heating element 2, which is held away from the wall of the glass tube by spacers 3. At its extremities the heating element is connected to contact elements 4, the ribbon contact being in the form of a sleeve 5 of molybdenum. A terminal tab 6 leads out of the sleeve and from it contacts 7 pass out through molybdenum sealing foils 8 within the pinched-off ends 9 of the quartz glass tube 1 to the external terminals 10.

Carbon radiators with spiral heating elements as in FIG. 1 have about 2.5 to 3 times greater surface area than carbon radiators with straight ribbon, and hence a 2.5 to 3 times greater power density. Also, infrared radiators equipped with carbon ribbons as heating elements have a substantially greater power density compared with infrared radiators with metallic heating elements. Consequently a substantially lower temperature is necessary for carbon ribbons as heating elements compared with heating elements that are formed from metal, in order to achieve the same power density. In concrete cases, power densities of 900 $kW/m^2$ are achieved in tungsten-halogen radiators at about 3000 Kelvin, while the correspondingly spiral carbon ribbon needed to be raised to a temperature of only 2170 Kelvin for the same power density.

The infrared radiator represented in FIG. 1 can be operated at temperatures>1000° C. For this purpose a ratio of the inside diameter of the quartz glass tube to the diameter of the coil of the heating elements of at least 1.5, and especially 1.7, is necessary. At a diameter ratio of at least 2.5, the heating element can be operated at temperatures above 1500° C. The spacers 3 are made of molybdenum, for example. Tungsten or tantalum or alloys of the said metals can also be used. The length of the spacers 3 in the axial direction is greater than that of the axial interstice between two heating coil sections of the heating elements 2. An insulating ceramic insert 11 is placed between the individual spacers 3 and the heating element in order to prevent damage to the heating element 2 and hence premature failure. The ceramic insert is made from aluminum oxide or zirconium dioxide, depending on the intended operating temperature.

Figure 2:
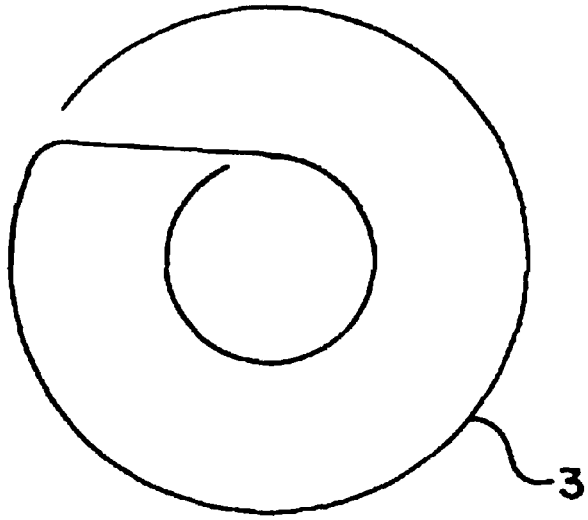
FIGS. 2–9 various embodiments for spacers.
Figure 3:
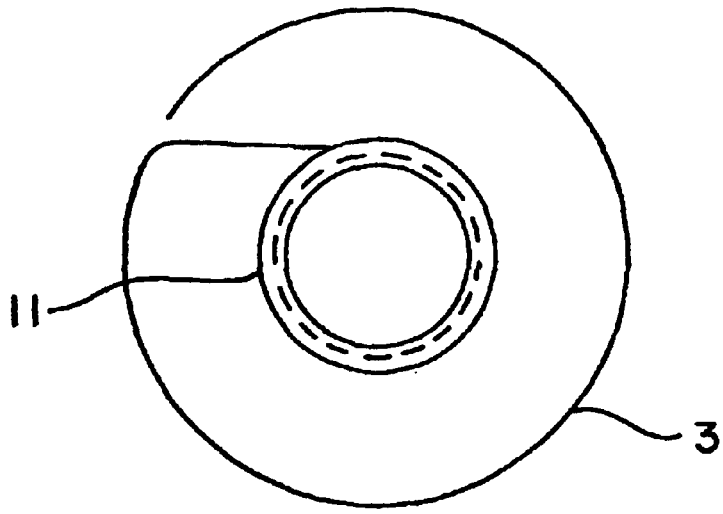
Figure 4:
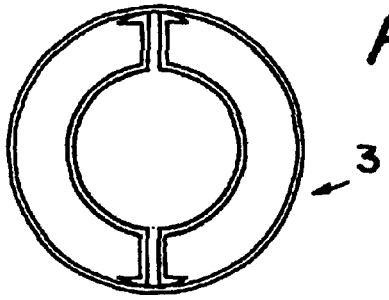
Figure 5:
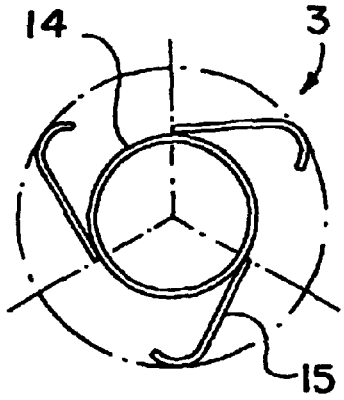
Figure 6:
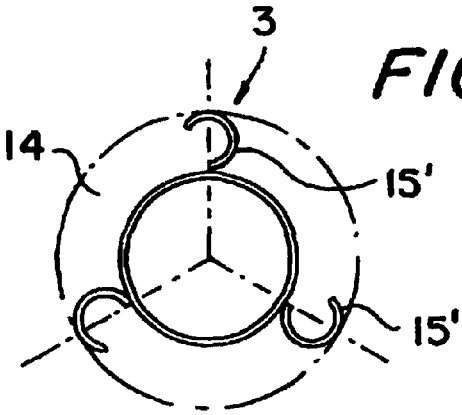
Figure 7:
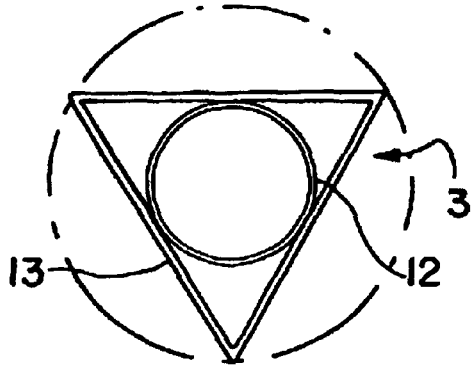
Figure 8:
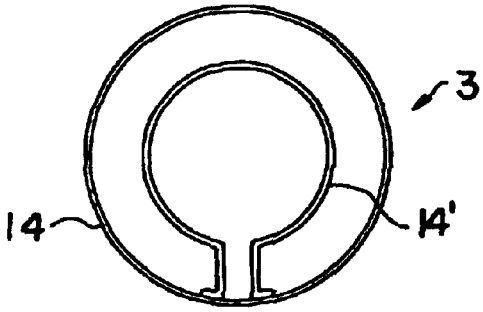

Various special embodiments of the spacers 3 are represented in FIGS. 2 to 9. FIG. 2 shows a very simple and inexpensive embodiment. FIG. 3 shows this embodiment with a ceramic insert 11. The embodiments represented in FIGS. 2 to 8 are made preferably of metals, more complicated embodiments such as those represented in FIGS. 4 to 8 can be welded together from single parts. The spacer represented in FIG. 4 is especially stable due to its concentric configuration and bilateral fixation of the inner ring, as is the spacer of FIG. 7, in which an annular piece 12 is surrounded by a triangle 13. In this embodiment the contact surface between the spacer 3 and the glass tube 1 is especially small. The embodiments in FIGS. 5 and 6 are very similar, an inner ring 14 being surrounded in both by spring arms 15 and 15' which support the inner ring 14 on the glass tube 1. FIG. 8 shows another embodiment in which two rings 14, 14' are concentric with one another.

Figure 9:
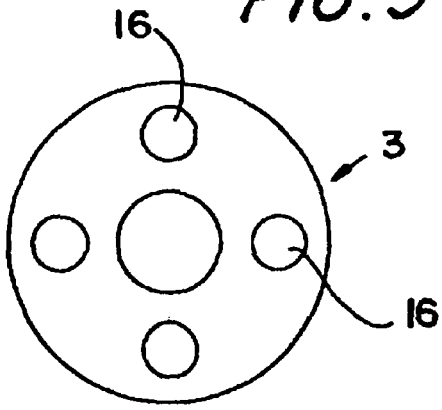

In FIG. 9 there is represented a spacer 3 of a ceramic material (aluminum oxide or zirconium dioxide). In this embodiment the arrangement of an additional ceramic insert 11 is unnecessary. This spacer has openings 16 which prevent the formation of a plurality of chambers separated from one another within the radiator. The openings permit problem-free evacuation of the quartz glass tube 1.

Figure 12:
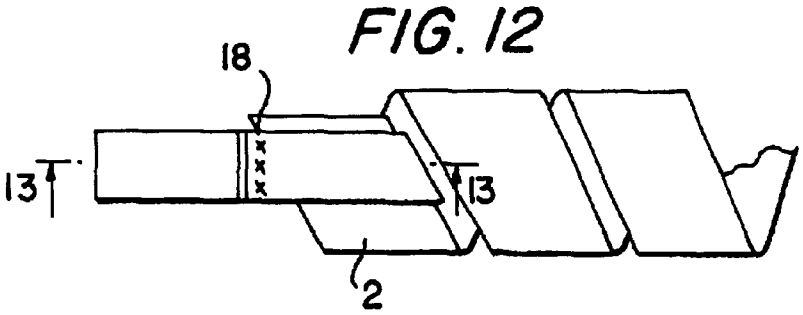
FIG. 12 a schematic view of the making of a contact.
Figure 13:
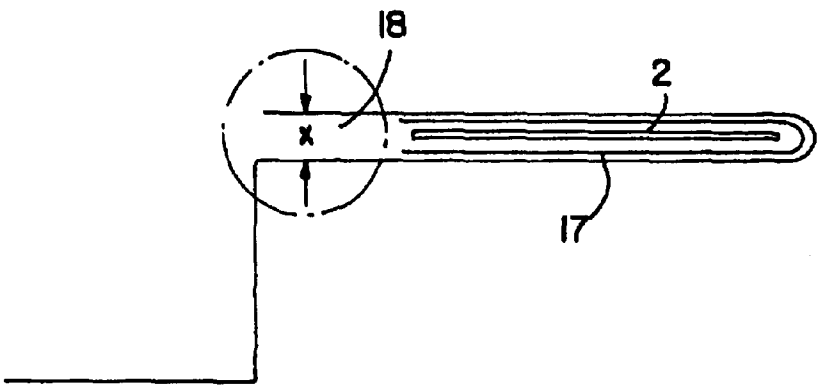
FIG. 13 a section through the contact with spot weld.
Figure 10:
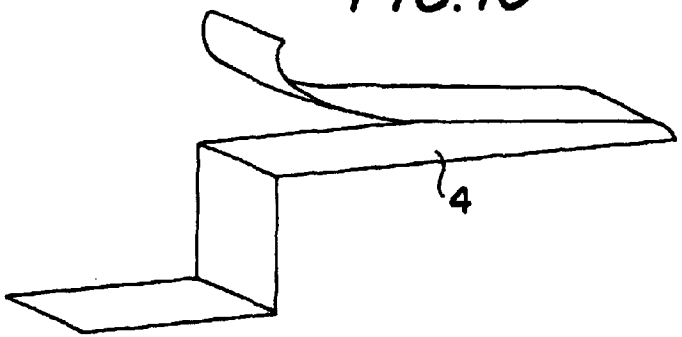
FIG. 10 a contact element.
Figure 11:
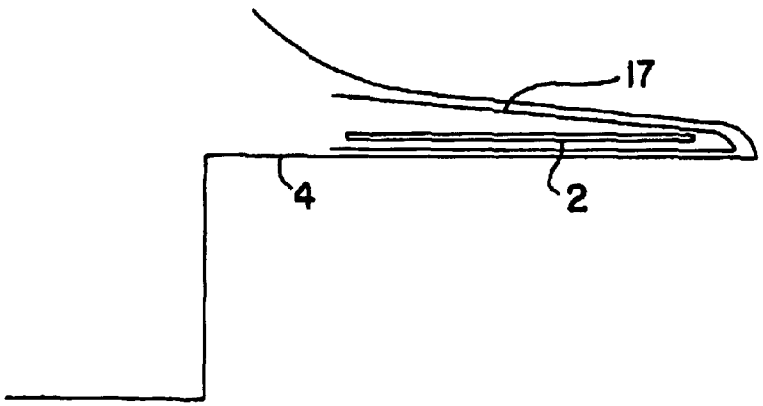
FIG. 11 the arrangement of a contact element on the heating element.
Figure 14:
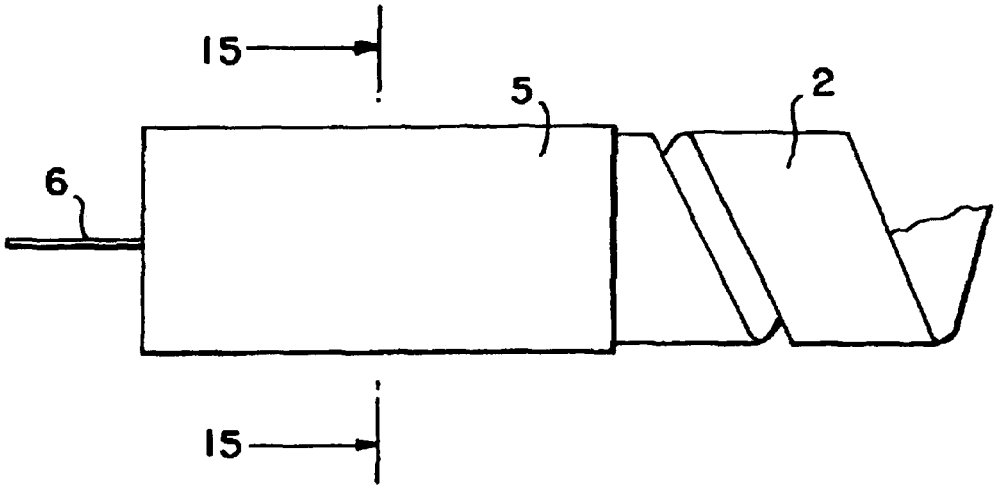
FIG. 14 a contact with the heating element.
Figure 15:
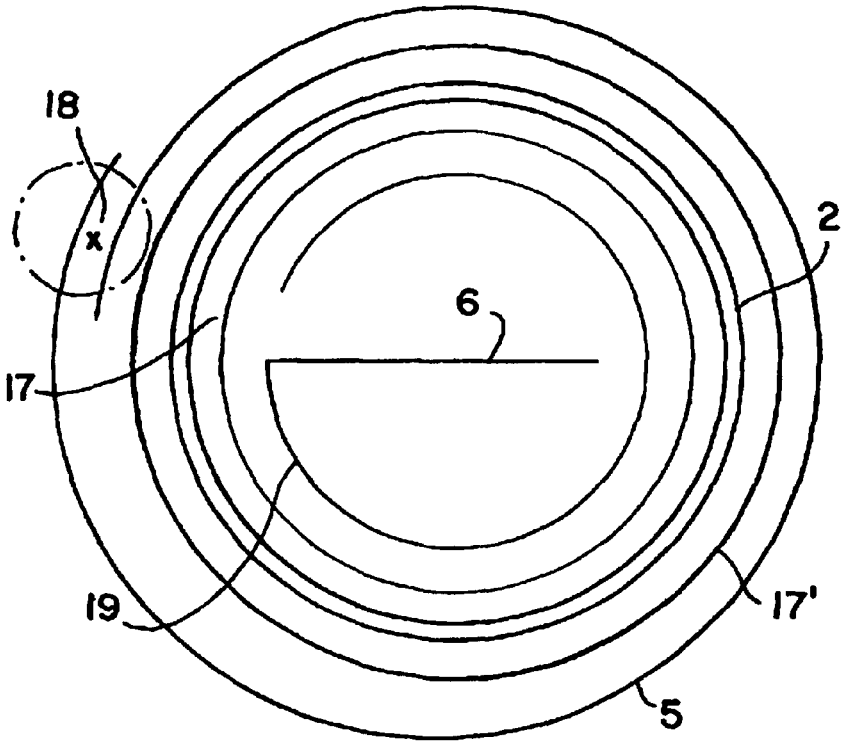
FIG. 15 a schematic cross section of the contact.

An embodiment of the carbon spiral's connection is represented in FIGS. 10 to 13. FIG 10 shows a contact element 4 of a resilient material, molybdenum for example. FIG. 11 shows the contact element, which is slipped over the carbon ribbon of heating element 2 and clutches it on both sides. Graphite paper 17 is placed between the two materials to improve contact. This layered assembly is compressed together and welded at the weld 18 marked "X" by resistance welding or laser welding, the two limbs of the contact element being bonded directly together and holding between them the carbon ribbon of the heating element 2 as well as the graphite paper 17. FIG. 12 shows a schematic view of this contact assembly, wherein the two spot welds 18 are marked. The sectional view is represented along the line A—A in FIG. 13. FIGS. 14 and 15 show another embodiment of the contact assembly, FIG. 15 showing a section taken along line A—A from FIG. 14, the carbon spiral of the heating element 2 being surrounded by a sleeve 5. Graphite paper 17' is placed between the sleeve 5 and the carbon spiral of the heat radiator 2. The sleeve 5 is made of molybdenum. Within the sleeve 5 there is an inner sleeve 19 which opens into the outwardly leading terminal tab 6. Graphite paper 17 is also placed between the inner sleeve 19 and the heating element 2. The layers lie tightly on one another, and the spaces shown in the drawings (FIGS. 11, 13 and 15) being present only for better comprehension. A noble metal paste or a metallic coating, preferably of nickel or a noble metal, applied to the ends of the heating element 2, can be provided between the graphite paper 17, 17' and the heating element 2; the metallic coating can be applied galvanically to the heating element. This coating and noble metal paste can be provided both on the inside and on the outside of the heating element 2, i.e., both between the heating element 2 and the inner sleeve 19 and between the heating element 2 and the outer sleeve 5. The coating or noble metal paste are omitted from the figures for the sake of simplicity.

It is claimed:

1. An infrared radiator comprising:

a heating element, said heating element having ends and comprising a quartz glass tube having carbon fibers arranged therein, said ends of said heating element joined to contact elements running through a wall of the quartz glass tube, said heating element being positioned away from the wall of said quartz glass tube; the heating element being centered on the axis of the quartz glass tube by means of at least one spacer, wherein a ceramic material is arranged between said heating element and said at least one spacer.

2. An infrared radiator according to claim 1, wherein the heating element has the form of a spiral or coiled ribbon.

3. An infrared radiator according to claim 2, wherein the inside diameter of the quartz glass tube is at least 1.5 times as great as the diameter of the spirals or coils of the heating element.

4. An infrared radiator according to claim 1, wherein the [spacers] *at least one spacer* comprises at least one metal selected from the group consisting of molybdenum, tungsten and tantalum, or an alloy of these metals.

5. An infrared radiator according to claim 1, wherein the [spacers have] *at least one spacer has*, at least on [their] *its* side facing the heating element, a length in the longitudinal direction of the heating element such that it is greater than the spaces formed in this longitudinal direction between the coils of the heating element.

6. An infrared radiator according to claim 1, wherein the ceramic is selected from the group consisting of aluminum oxide and zirconium dioxide.

7. An infrared radiator according claim 1, wherein the contact elements are formed of resilient material at their ends and joined to the heating element.

8. An infrared radiator according to claim 7, wherein the resilient material is formed of molybdenum.

9. An infrared radiator according to claim 1, wherein the ends of the contact elements which are joined to the heating element are in the form of sleeves clutching the ends of the heating element.

10. An infrared radiator according to claim 9, wherein the sleeves are formed of molybdenum.

11. An infrared radiator according to claim 1, wherein the graphite is disposed between the ends of the heating element and the contact elements.

12. An infrared radiator according to claim 11, wherein the graphite is a graphite paper.

13. An infrared radiator according to claim 12, wherein at least one of a noble metal paste or a metallic coating applied to the ends of the heating element is placed between the graphite and the heating element.

14. An infrared radiator according to claim 13, wherein the metallic coating is formed of nickel or a noble metal.

15. An infrared radiator according to claim 13, wherein the metallic coating is applied galvanically.

16. An infrared radiator according to claim 1, wherein contact making parts are joined to one another by means of resistance welding or laser welding.

17. A method for operating an infrared radiator according claim 1, comprising heating said heating element to a temperature greater than 1000° C.

18. A method for operating an infrared radiator according to claim 17, wherein the heating element is [heating] *heated* to a temperature greater than 1500° C.

19. An infrared radiator comprising:

a heating element, said heating element *having ends and* comprising a quartz glass tube having a wall and having carbon fibers arranged therein, said ends of the heating element joined to contact elements running through the wall of said quartz glass tube, the heating element being spaced away from the wall of the quartz glass tube, and wherein the heating element is centered on the axis of the quartz glass tube by spacers, said spacers comprising a metal oxide selected from the group consisting of aluminum oxide and zirconium dioxide.

20. An infrared radiator according to claim 19, wherein the heating element has the form of a spiral or coiled ribbon.

21. An infrared radiator according to claim 20, wherein the inside diameter of the quartz glass tube is at least 1.5 times as great as the diameter of the spirals or coils of the heating element.

22. An infrared radiator according to claim 19, wherein the spacers have, at least on their side facing the heating element, a length in the longitudinal direction of the heating element such that it is greater than the spaces formed in this longitudinal direction between the coils of the heating element.

23. An infrared radiator according to claim 19, wherein the contact elements are formed of resilient material at their ends and joined to the heating element.

24. An infrared radiator according to claim 23, wherein the resilient material is formed of molybdenum.

25. An infrared radiator according to claim 19, wherein the ends of the contact elements which are joined to the heating element are in the form of sleeves clutching the ends of the heating element.

26. An infrared radiator according to claim 25, wherein the sleeves are formed of molybdenum.

27. An infrared radiator according to claim 19, wherein the graphite is disposed between the ends of the heating element and the contact elements.

28. An infrared radiator according to claim 27, wherein the graphite is a graphite paper.

29. An infrared radiator according to claim 28, wherein at least one of a noble metal paste or a metallic coating applied to the ends of the heating element is placed between the graphite and the heating element.

30. An infrared radiator according to claim 29, wherein the metallic coating is formed of nickel or a noble metal.

31. An infrared radiator according to claim 29, wherein the metallic coating is applied galvanically.

32. An infrared radiator according to claim 23, wherein contact making parts are joined to one another by means of resistance welding or laser welding.

33. A method for operating an infrared radiator according to claim 19, comprising heating said heating element to a temperature greater than 1000° C.

34. A method for operating an infrared radiator according to claim 33, wherein the heating element is heating to a temperature greater than 1500° C.

*35. An infrared radiator according to claim 19, wherein contact making parts are joined to one another by means of resistance welding or laser welding.*

* * * * *